United States Patent
Yao et al.

(10) Patent No.: US 12,266,997 B2
(45) Date of Patent: Apr. 1, 2025

(54) THERMAL BRIDGE FOR AN ELECTRIC MACHINE

(71) Applicant: GM Global Technology Operations LLC, Detroit, MI (US)

(72) Inventors: Jian Yao, Shanghai (CN); Chengwu Duan, Shanghai (CN); SeungHwan Keum, Northville, MI (US); Denghao Fan, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 239 days.

(21) Appl. No.: 17/866,910

(22) Filed: Jul. 18, 2022

(65) Prior Publication Data

US 2023/0387757 A1    Nov. 30, 2023

(30) Foreign Application Priority Data

May 27, 2022    (CN) .......................... 202210584440.0

(51) Int. Cl.
*H02K 9/22*    (2006.01)
*H02K 5/20*    (2006.01)
*H02K 9/19*    (2006.01)

(52) U.S. Cl.
CPC ............. *H02K 9/223* (2021.01); *H02K 5/203* (2021.01); *H02K 9/19* (2013.01)

(58) Field of Classification Search
CPC ........ H02K 9/223; H02K 5/203; H02K 1/185; H02K 9/22; H02K 2205/00; H02K 5/18; H02K 1/145; H02K 9/18; H02K 5/02; H02K 1/2793; H02K 9/19; H02K 21/24
USPC ...................................................... 310/64, 63
See application file for complete search history.

(56) References Cited

U.S. PATENT DOCUMENTS

| | | | |
|---|---|---|---|
| 5,196,749 A | 3/1993 | Palma et al. | |
| 6,181,038 B1* | 1/2001 | Van Rooij | H02K 9/223 |
| | | | 310/64 |
| 10,446,181 B1* | 10/2019 | Hutchinson | G11B 5/6082 |
| 2011/0234028 A1 | 9/2011 | Iwasaki et al. | |
| 2016/0294231 A1* | 10/2016 | Andres | H02K 5/18 |
| 2017/0040832 A1* | 2/2017 | Yuasa | B60R 16/02 |
| 2017/0271954 A1* | 9/2017 | Hanumalagutti | H02K 5/18 |
| 2018/0351435 A1* | 12/2018 | Takano | H02K 9/223 |
| 2019/0199164 A1* | 6/2019 | Gieras | H02K 7/025 |
| 2020/0177050 A1* | 6/2020 | Jiwariyavej | H02K 9/223 |

FOREIGN PATENT DOCUMENTS

EP    3605805 A1    2/2020

* cited by examiner

*Primary Examiner* — Terrance L Kenerly
*Assistant Examiner* — Theodore L Perkins
(74) *Attorney, Agent, or Firm* — CANTOR COLBURN LLP

(57) ABSTRACT

An electric machine includes a housing having an inner surface; and a stator including a stator core mounted in the housing. The stator core includes a plurality of stator windings, a thermal bridge extends between the stator core and the inner surface of the housing. The thermal bridge is formed from a non-magnetic material and includes a plurality of individual thermal bridge elements.

20 Claims, 3 Drawing Sheets

THERMAL BRIDGE FOR AN ELECTRIC MACHINE

CROSS-REFERENCE TO RELATED APPLICATIONS

This application claims priority to China Patent Application No. CN202210584440.0, filed May 27, 2022, the contents of which are incorporated by reference herein in their entirety.

INTRODUCTION

The subject disclosure relates to the art of electric machines and, more particularly, to a thermal bridge that connects a stator core to a housing of the electric machine to promote thermal energy dissipation.

Electric machines include a stator that is supported at an internal surface of a housing and a rotor that is positioned within the stator. The stator includes stator windings that are energized to produce a magnetic field within the rotor. The magnetic field causes the rotor to spin and produce power. During operation, the stator and rotor produce heat. Various systems are employed to reduce heat produced by an electric machine including passing an airflow through the housing or incorporating coolant jackets into the housing.

In certain electric machines, such as axial flux machines, it is desirable to reduce flux leakage through the use of very low permeability materials for the housing. Further, often times, an insulator, such as epoxy, may be present between the stator windings and the housing. Materials such as epoxy have poor thermal conductivity. As such, heat transfer between the stator windings and the housing may be reduced. Accordingly, it would be desirable to create a thermal flow path between stator windings and a surrounding housing in order to improve thermal dissipation without increasing flux leakage.

SUMMARY

An electric machine, in accordance with a non-limiting example, includes a housing having an inner surface; and a stator including a stator core mounted in the housing. The stator core includes a plurality of stator windings, a thermal bridge extends between the stator core and the inner surface of the housing. The thermal bridge is formed from a non-magnetic material and includes a plurality of individual thermal bridge elements.

In addition to one or more of the features described herein the stator core includes a first side and a second side that is opposite the first side, the thermal bridge including a first thermal bridge member extending between the first side and the inner surface and a second thermal bridge member extending between the second side and the inner surface.

In addition to one or more of the features described herein the plurality of stator windings includes a plurality of coils, each of the plurality of coils being positioned between the first thermal bridge member and the second thermal bridge member.

In addition to one or more of the features described herein the thermal bridge includes a base element extending along one of the stator core and the inner surface of the housing, the plurality of individual thermal bridge elements extending from the base element toward the other of the stator core and the inner surface of the housing.

In addition to one or more of the features described herein each of the plurality of individual thermal bridge elements includes a first end connected with the base element and a second end connected to the other of the stator core and the inner surface of the housing, the second end including circumferential width that is greater than a circumferential width of the first end.

In addition to one or more of the features described herein the second end of each of the plurality of individual thermal bridge elements includes a triangular form.

In addition to one or more of the features described herein each of the plurality of individual thermal bridge elements includes a first end connected with the base element and a second end extending toward the stator core, each of the plurality of thermal bridge elements having a uniform circumferential cross-section.

In addition to one or more of the features described herein the thermal bridge includes a first base element extending along the stator core and a second base element extending along the inner surface of the housing, the plurality of individual thermal bridge elements extending between the first base element and the second base element.

In addition to one or more of the features described herein each of the plurality of individual thermal bridge elements includes a uniform circumferential width.

In addition to one or more of the features described herein the thermal bridge is formed from a material having a thermal conductivity of at least 100 W/m-° C.

In addition to one or more of the features described herein the thermal bridge includes a magnetic permeability of no more than one-tenth ($1/10^{th}$) that of a material forming the housing.

In addition to one or more of the features described herein the thermal bridge has an axial thickness of between about 1-mm and about 2-mm.

In addition to one or more of the features described herein the stator core is formed from a plurality of individual segments, each of the plurality of individual segments being connected to the inner surface of the housing by a corresponding thermal bridge member.

In addition to one or more of the features described herein a rotor is mounted to a shaft in the housing spaced from the stator core by a gap, the shaft defining an axis of rotation of the rotor.

In addition to one or more of the features described herein the gap extends substantially parallel to the axis of rotation.

In addition to one or more of the features described herein rotation of the rotor relative to the stator generates a magnetic flux having a direction that is substantially parallel to the axis of rotation.

In addition to one or more of the features described herein the housing includes a coolant jacket including a coolant inlet and a coolant outlet.

Also disclosed in accordance with a non-limiting example is a thermal bridge for an electric machine including a member formed from a non-magnetic material configured to be arranged between and in contact with a stator core and an inner surface of a machine housing. The member includes a plurality of individual thermal bridge elements.

In addition to one or more of the features described herein the thermal bridge includes a base element, each of the plurality of individual thermal bridge elements includes a first end connected with the base element and a second end, the second end including circumferential width that is greater than a circumferential width of the first end.

In addition to one or more of the features described herein the thermal bridge includes a first base element and a second base element, the plurality of individual thermal bridge elements extending between the first base element and the second base element.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
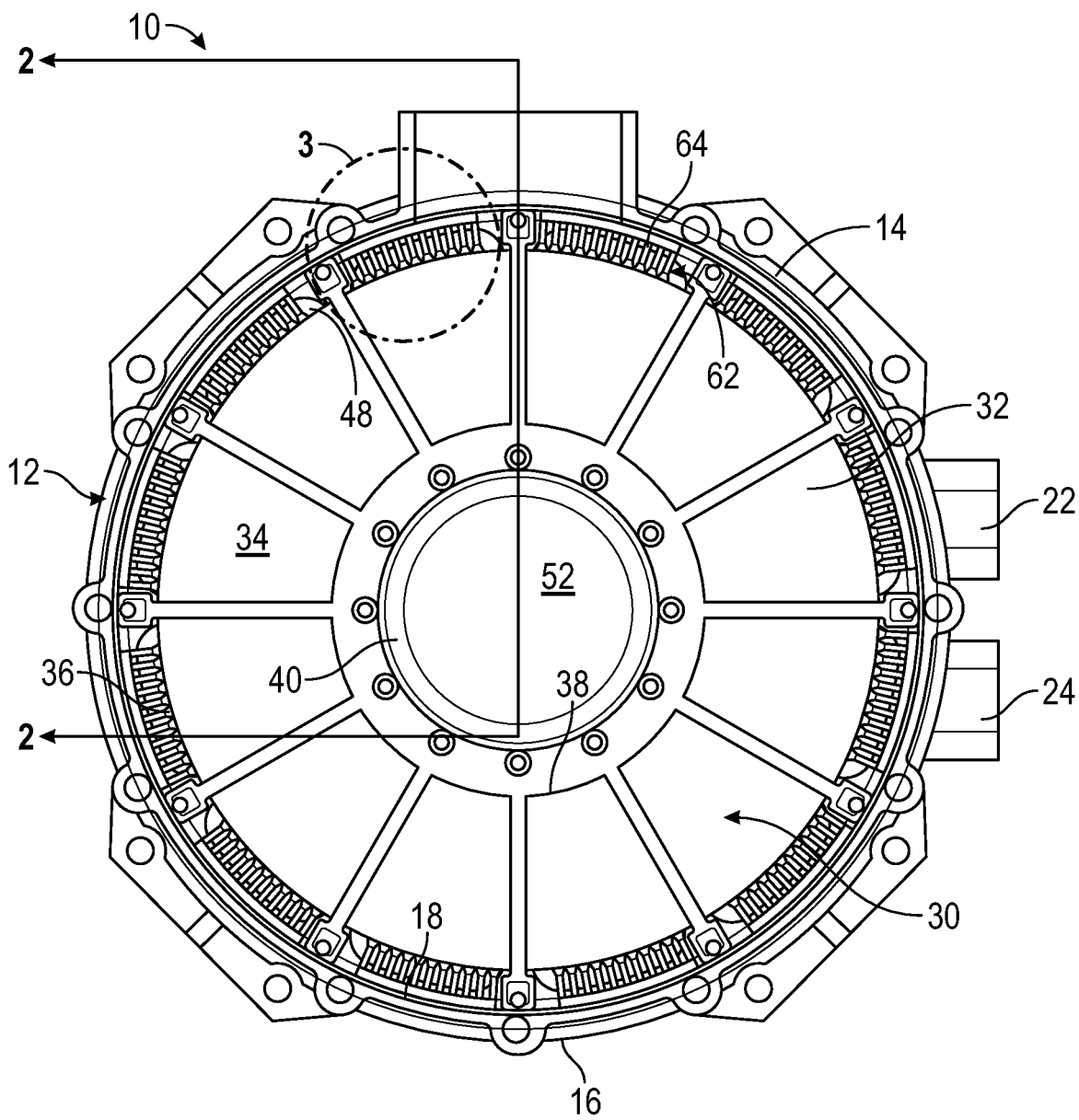
FIG. 1 is an axial end view of an electric machine including a thermal bridge, in accordance with a non-limiting example.

The following description is merely exemplary in nature and is not intended to limit the present disclosure, its application or uses. It should be understood that throughout the drawings, corresponding reference numerals indicate like or corresponding parts and features.

Figure 2:
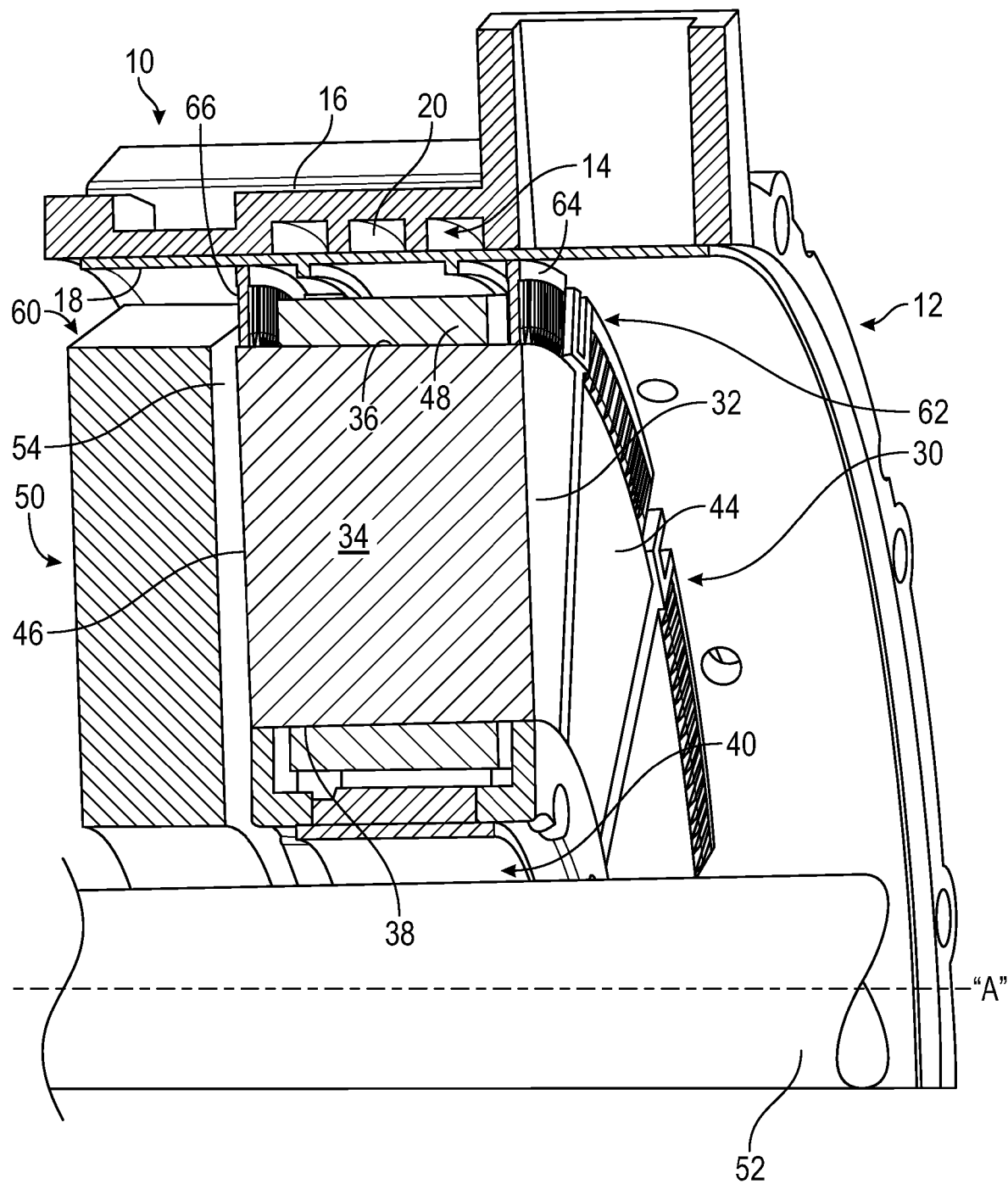
FIG. 2 is a partial cross-sectional perspective view of the electric machine of FIG. 1 taken along the line 2-2, in accordance with a non-limiting example.

An electric machine, in accordance with a non-limiting example, is indicated generally at 10 in FIG. 1. Electric machine 10 includes a housing 12 that supports a coolant jacket 14. Housing 12 includes an outer surface 16 and an inner surface 18 between which are formed a plurality of passages 20, FIG. 2, that define coolant jacket 14. Housing 12 further includes a coolant inlet 22 and a coolant outlet 24. In a non-limiting example, a coolant, such as oil, is passed through coolant inlet 22, circulated through coolant jacket 14 to absorb heat, and then passed from coolant outlet 24 where the coolant is treated to remove absorbed heat.

In a non-limiting example, a stator 30 is arranged within housing 12. Stator 30 includes a stator core 32 that may be formed from a plurality of stator segments 34. Stator 30 includes a radially outward facing surface 36 and a radially inwardly facing surface 38. Radially inwardly facing surface 38 defines a passage 40. Stator 30 also includes a first axially facing side 44 and a second axially facing side 46 that is opposite to the first axially facing side 44. Each stator segment 34 includes a coil 48 that forms part of a plurality of stator windings. Coil 48 is disposed between first axially facing side 44 and second axially facing side 46.

In a non-limiting example, a rotor 50 is arranged adjacent to stator 30. Rotor 50 is mounted to a shaft 52 that extends through passage 40 and defines a rotational axis "A". Rotor 50 is spaced from stator 30 by a gap 54 that extends along the rotational axis "A". Rotor 50 is rotatable relative to stator 30. That is, an electric current passing through stator 30 develops a magnetic field that rotates rotor 50. The magnetic field passes along an axis that is substantially parallel to the rotational axis "A". As such, electric machine 10 defines an axial flux motor 60. However, it should be understood that other motor arrangements may also benefit from the non-limiting examples described herein.

In a non-limiting example, a thermal bridge 62 extends between stator core 32 and inner surface 18 of housing 12. As will be detailed herein, thermal bridge 62 conducts heat from stator core 32 toward inner surface 18 and into coolant flowing through coolant jacket 14. In a non-limiting example, thermal bridge 62 includes a first thermal bridge member 64 that extends between radially outwardly facing surface 36 at first side 44 and inner surface 18 and a second thermal bridge member 66 that extends between radially outwardly facing surface 36 at second side 46 and inner surface 18. In a non-limiting example, each of the plurality of stator segments 34 includes a corresponding first and second thermal bridge members 64 and 66.

In a non-limiting example, each thermal bridge member 64 and 66 is formed from a material having a thermal conductivity of at least 100 W/m-° C. In accordance with another non-limiting example, each thermal bridge member 64 and 66 includes a magnetic permeability of no more than one-tenth ($\frac{1}{10}^{th}$) that of the magnetic permeability of the material forming the housing. In a non-limiting example, each thermal bridge member 64 and 66 is formed from aluminum.

Figure 3:
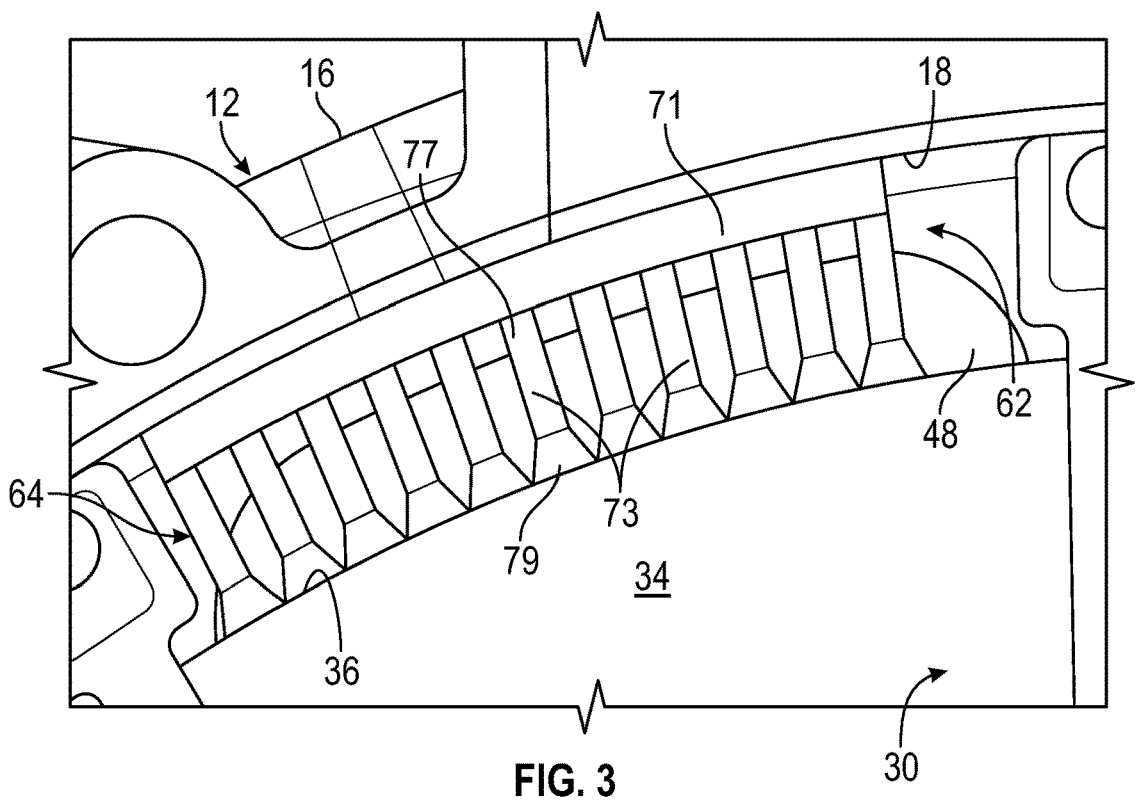
FIG. 3 is a plan view of a thermal bridge taken at circle 3 in FIG. 1, in accordance with a non-limiting example.

Reference will now follow to FIG. 3 in describing first thermal bridge member 64 with an understanding that second thermal bridge member 66 may include similar structure. In a non-limiting example, thermal bridge member 64 includes a base element 71 and a plurality of individual thermal bridge elements 73. In a non-limiting example, base element 71 abuts inner surface 18 of housing 12 opposite one of the plurality of stator segments 34. Each of the plurality of individual thermal bridge elements 73 extends from base element 71 and engage radially outwardly facing surface 36 of the one of the plurality of stator segments 34.

In a non-limiting example, each of the plurality of individual thermal bridge elements 73 includes a first end 77 and a second end 79 that is opposite to first end 77. First end 77 is coupled to base element 71. In a non-limiting example, first end 77 is integrally formed with base element 71. In a non-limiting example, second end 79 includes a generally triangular form including first and second angled sides (not separately labeled) that connect to a base (also not separately labeled). The term triangular form should be understood to mean that second end 79 includes a circumferential dimension that is greater than a circumferential dimension of first end 77. The triangular form provides an increased contact area between each thermal bridge member 64 and the corresponding radially outwardly facing surface 36 of the plurality of stator segments 34. In addition, the use of multiple individual thermal bridge elements 73 reduces eddy current development in each thermal bridge element 64.

Figure 4:
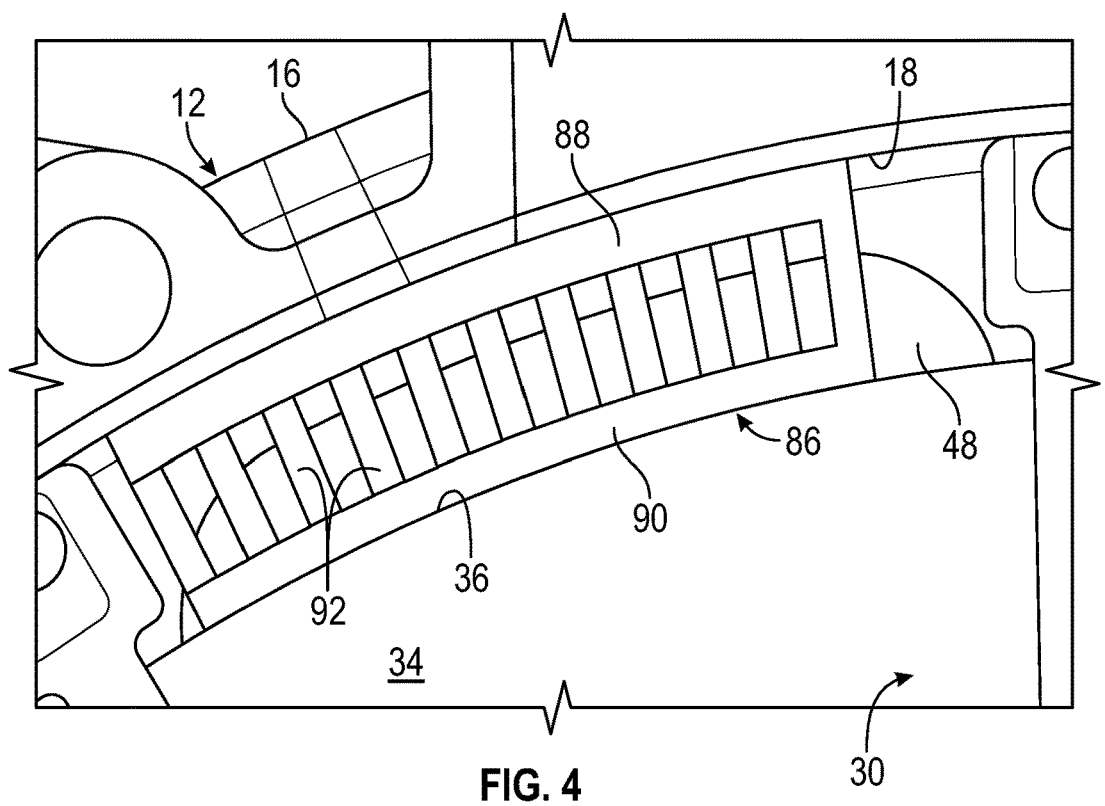
FIG. 4 is a is a plan view of a thermal bridge, in accordance with another non-limiting example.

Reference will now follow to FIG. 4 in describing a thermal bridge member 86 in accordance with another non-limiting example. Thermal bridge member 86 includes a first base element 88, a second base element 90, and a plurality of individual thermal bridge elements 92 extending between and connected to each of the first base element 88 and second base element 90. In a non-limiting example, first base element 88, second base element 90 and the plurality of individual thermal bridge elements 92 are integrally formed. First base element 88 rests upon inner surface 18 of housing 12. Second base element 90 rests upon radially outwardly facing surface 36 of stator core 32. First and second base elements 88 and 90 increase surface contact with respective ones of inner surface 18 and radially outwardly facing surface 36 in order to increase heat transfer. In a manner similar to that discussed herein, the use of multiple individual thermal bridge elements 92 reduces eddy current development in each thermal bridge member 86.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An electric machine comprising:
   a housing having an inner surface;
   a stator including a stator core mounted in the housing, the stator core including a plurality of stator windings;
   a rotor mounted to a shaft in the housing, the rotor being adjacent to a first axial end of the stator, the rotor being axially spaced apart from the stator, such that the electric machine is an axial air gap electric machine;
   a first thermal bridge extending between the stator core and the inner surface of the housing at a first axial end of the stator core and a second thermal bridge, distinct from the first thermal bridge and extending between the stator core and the inner surface of the housing at a second axial end of the stator core, the first and second thermal bridges being formed from a non-magnetic material and including a plurality of individual thermal bridge elements.

2. The electric machine according to claim 1, wherein the first thermal bridge and the second thermal bridge are distinct components separated axially by a part of the plurality of stator windings.

3. The electric machine according to claim 2, wherein the part of the plurality of stator windings includes a plurality of coils, each of the plurality of coils being positioned between the first thermal bridge and the second thermal bridge.

4. The electric machine according to claim 1, wherein the first thermal bridge includes a first base element extending along one of the stator core and the inner surface of the housing and the second thermal bridge includes a second base element extending along the one of the stator core and the inner surface of the housing, wherein the first base element and the second base element are distinct elements, and the plurality of individual thermal bridge elements extend radially from the base element toward the other of the stator core and the inner surface of the housing.

5. The electric machine according to claim 4, wherein each of the plurality of individual thermal bridge elements includes a first end connected with one of the first base element and the second base element and a second end connected to the other of the stator core and the inner surface of the housing, the second end including circumferential width that is greater than a circumferential width of the first end.

6. The electric machine according to claim 5, wherein the second end of each of the plurality of individual thermal bridge elements includes radially aligned cross section shape, and wherein the radially aligned cross section shape is a triangular form.

7. The electric machine according to claim 4, wherein each of the plurality of individual thermal bridge elements includes a first end connected with one of the first base element and the second base element and a second end extending toward the stator core, each of the plurality of thermal bridge elements having a uniform circumferential cross-section.

8. The electric machine according to claim 1, wherein the first thermal bridge includes a first base element extending along the stator core and a second base element extending along the inner surface of the housing, the second thermal bridge includes a third base element extending along the stator core and a fourth base element extending along the inner surface of the housing, the first and second base elements being distinct from the third and fourth base elements the plurality of individual thermal bridge elements extending between one of the first and second base element and the third and fourth base element.

9. The electric machine according to claim 8, wherein each of the plurality of individual thermal bridge elements includes a uniform circumferential width.

10. The electric machine according to claim 1, wherein the first and second thermal bridges are formed from a material having a thermal conductivity of at least 100 W/m-°C.

11. The electric machine according to claim 1, wherein the first and second thermal bridges each include a magnetic permeability of no more than one-tenth ($1/10^{th}$) that of a material forming the housing.

12. The electric machine according to claim 1, wherein each of the first and second thermal bridges has an axial thickness of between about 1-mm and about 2-mm.

13. The electric machine according to claim 1, wherein the stator core is formed from a plurality of individual segments, each of the plurality of individual segments being connected to the inner surface of the housing by a corresponding one of the first and second thermal bridges.

14. The electric machine according to claim 1, wherein the gap extends substantially parallel to the axis of rotation.

15. The electric machine according to claim 1, wherein rotation of the rotor relative to the stator generates a magnetic flux having a direction that is substantially parallel to the axis of rotation.

16. The electric machine according to claim 1, wherein the housing includes a coolant jacket including a coolant inlet and a coolant outlet.

17. A thermal bridge for an electric machine including a housing having an inner surface, a stator having a stator core mounted in the housing, the stator core including a plurality of stator windings, and a rotor mounted to a shaft in the housing, the rotor being adjacent to a first axial end of the stator, the rotor being axially spaced apart from the stator, such that the electric machine is an axial air gap electric machine, wherein the thermal bridge comprises:
   a first member formed from a non-magnetic material and configured to be arranged between and in contact with the stator core and an inner surface of the housing, the first member including a plurality of individual thermal bridge elements;
   a second member formed from the non-magnetic material and configured to be arranged between and in contact with the stator core and the inner surface of the housing; and
   wherein the second member is configured to be axially spaced apart from the first member.

18. The thermal bridge according to claim 17, wherein the thermal bridge includes a base element, each of the plurality of individual thermal bridge elements includes a first end connected with the base element and a second end, the second end including circumferential width that is greater than a circumferential width of the first end.

19. The thermal bridge according to claim 17, wherein the thermal bridge includes a first base element and a second base element, the plurality of individual thermal bridge elements extending between the first base element and the second base element.

20. An electric machine comprising:
a housing having an inner surface;
a stator including a stator core mounted in the housing, the stator core including a plurality of stator windings;
a rotor mounted to a shaft in the housing, the rotor being adjacent to a first axial end of the stator, the rotor being axially spaced apart from the stator, such that the electric machine is an axial air gap electric machine;
a thermal bridge extending between the stator core and the inner surface of the housing, the thermal bridge including a first base element extending along the stator core and a second base element extending along the inner surface of the housing, the plurality of individual thermal bridge elements extending between the first base element and the second base element;
the first thermal bridge element extending between the stator core and the housing at the first axial end of the stator and the second thermal bridge element extending between the stator core and the housing at a second axial end of the stator, wherein the second axial end is opposite the first axial end;
the thermal bridge being formed from a non-magnetic material and including a plurality of individual thermal bridge elements, each of the plurality of individual thermal bridge elements including a uniform circumferential width, and including a base element extending along one of the stator core and the inner surface of the housing, the plurality of individual thermal bridge elements extending from the base element toward the other of the stator core and the inner surface of the housing;
each of the plurality of individual thermal bridge elements includes a first end connected with the base element and a second end connected to the other of the stator core and the inner surface of the housing, the second end including circumferential width that is greater than a circumferential width of the first end wherein the second end of each of the plurality of individual thermal bridge elements includes radially aligned cross section shape, and wherein the radially aligned cross section shape is a triangular form;
wherein each of the plurality of individual thermal bridge elements includes a first end connected with the base element and a second end extending toward the stator core, each of the plurality of thermal bridge elements having a uniform circumferential cross-section;
wherein the stator core includes a first side and a second side that is opposite the first side, the thermal bridge including a first thermal bridge member extending between the first side and the inner surface and a second thermal bridge member extending between the second side and the inner surface, and wherein the first thermal bridge member and the second thermal bridge members are distinct components and are separated axially by a part of the plurality of stator windings;
wherein the stator core is formed from a plurality of individual segments, each of the plurality of individual segments being connected to the inner surface of the housing by a corresponding thermal bridge member;
a rotor mounted to a shaft in the housing spaced from the stator core by a gap extending substantially parallel to the axis of rotation, the shaft defining an axis of rotation of the rotor and wherein rotation of the rotor relative to the stator generates a magnetic flux having a direction that is substantially parallel to the axis of rotation;
wherein the thermal bridge has an axial thickness of between about 1-mm and about 2-mm and is formed from a material having a thermal conductivity of at least 100 W/m-° C., and includes a magnetic permeability of no more than one-tenth (1/10th) that of a material forming the housing;
the part of the plurality of stator windings includes a plurality of coils, each of the plurality of coils being positioned between the first thermal bridge member and the second thermal bridge member; and
wherein the housing includes a coolant jacket including a coolant inlet and a coolant outlet.

* * * * *